United States Patent [19]

Rosenquest

[11] 4,323,376
[45] Apr. 6, 1982

[54] DUST COLLECTOR WITH QUICK RELEASE FILTER SUPPORT SYSTEM FOR USE IN DUST COLLECTORS

[76] Inventor: Arthur P. Rosenquest, 2302 N. Pine Ave., Arlington Heights, Ill. 60004

[21] Appl. No.: 182,945

[22] Filed: Sep. 2, 1980

[51] Int. Cl.³ .......................................... B01D 46/04
[52] U.S. Cl. ........................................ 55/304; 55/378; 55/380; 55/381; 55/483; 55/484; 55/493; 55/502; 55/DIG. 12
[58] Field of Search ................ 55/304, 378, 380, 381, 55/432, 480, 481, 483, 493, 499, 502, 506, 508, 484, 341 R, DIG. 12

[56] References Cited

U.S. PATENT DOCUMENTS

| | | | |
|---|---|---|---|
| 2,463,382 | 3/1949 | Hobbs | 55/508 |
| 2,583,881 | 1/1952 | Rasmussen | 55/304 |
| 2,667,233 | 1/1954 | Vedder | 55/304 |
| 3,160,908 | 12/1964 | Peabody et al. | 55/304 |
| 3,593,503 | 7/1971 | Andrews | 55/481 |
| 3,733,790 | 5/1973 | Pierce | 55/483 |
| 3,788,046 | 1/1974 | Kaeppler et al. | 55/481 |
| 3,816,984 | 6/1974 | Neumann | 55/502 |
| 4,264,345 | 4/1981 | Miller | 55/378 |

FOREIGN PATENT DOCUMENTS

| | | | |
|---|---|---|---|
| 622926 | 6/1927 | France | 55/481 |
| 2384425 | 11/1978 | France | 55/502 |
| 6412311 | 5/1965 | Netherlands | 55/378 |
| 637132 | 12/1978 | U.S.S.R. | 55/378 |

OTHER PUBLICATIONS

Arrestall Self-Contained Dust Arrester, Bulletin SCCS-100A, pp. 1-7, 10/75.
Dustvent, Inc., Bulletin PM-102, pp. 1-6, 1977.
Arrestall Self-Contained Dust Arrester, Bulletin SCCS-1-400.

*Primary Examiner*—David L. Lacey
*Attorney, Agent, or Firm*—Hill, Van Santen, Steadman, Chiara & Simpson

[57] ABSTRACT

A dust collecting apparatus with quick release filter support system comprising an enclosure, a bulkhead structure mounted to the interior walls of said enclosure, and defining upper and lower portions of said enclosure, means for the intake and exhaust of air from the surrounding environment in a single direction, a filter cloth assembly comprising a filter cloth affixed to and supported by a frame assembly inserted into said enclosure, and quick release clamping means used to bring said frame assembly into an air tight sealing arrangement with said bulkhead.

20 Claims, 9 Drawing Figures

DUST COLLECTOR WITH QUICK RELEASE FILTER SUPPORT SYSTEM FOR USE IN DUST COLLECTORS

BACKGROUND OF THE INVENTION

1. Field of the Invention

This invention relates to a quick releasing mounting for filters in dust collectors and the like and particularly deals with a suspension mounting for filter bags in an air stream which is easily actuated to selectively lock the bags in place and release them for replacement.

2. Prior Art

Heretofore replacement of filter bags or cloths in dust collector units has been awkward, time consuming, and has required cumbersome structure. Quick and easy replacement of filter units in dust collectors and the like filter apparatus is especially desirable in powder painting systems where the filter units should be changed on each change of paint color so that filtered out pigments and like solids can be recycled.

Accordingly, it would be an improvement in the art to provide a quick changeover suspension system for filter bags, filter cloths, and the like in dust collecting apparatuses and the like filter systems.

SUMMARY OF THE INVENTION

According to this invention there is now provided a quick release support or mounting for suspending filter bags or cloths in a filter apparatus which avoids heretofore time consuming, complicated and awkward mounting fastening means such as nuts and bolts, and instead utilizes lever actuated clamps to detachably mount the filter units in position.

In a preferred arrangement the filter bags or cloths are suspended from a peripheral frame assembly which is insertable into the air stream of a filter apparatus and sealingly secured in the apparatus by easily accessible clamps members. The arrangement is such that when the frame is clamped in place in the apparatus the air stream through the apparatus must pass through the filter bag assembly which then collects the filtered out particulate material on the outer surfaces of the bags or cloth.

The filter cloth apparatus may consist of a single continuous piece of fabric essentially rectangular in shape which is stitched and folded in such a manner so as to form generally parallel U-shaped folds defining a series of pockets or bag filter elements. The folds are attached to a filter bag frame assembly by adhesive or the like, and four quick release clamp mechanisms may be attached to the top of the four corners of a bulkhead structure in the filter apparatus. A gasket may be provided on the underside of the bulkhead to form an air tight seal with the filter bag frame. The clamps lift the frame into sealing engagement with the gasket, and when released the frame and bag assembly is easily removed from the filter apparatus.

It is, therefore, an object of this invention to provide a mounting for filters in a dust collector accommodating quick and easy replacement of the filters.

A further object of the invention is to provide a bag filter support for quick change of bags in a filter unit for powder painting apparatus where it is desired to recover pigments from the paint without color contamination from previously used powders.

A still further object of the invention is to provide a dust collector unit with quick release toggle clamps mechanism for suspending the filter units in an air stream.

A specific object of the invention is to provide a quick release mounting for the tray frames of filter cloths in a filter apparatus.

Other objects, features and advantages of the invention will be readily apparent from the following description of several embodiments thereof, taken in conjunction with the accompanying drawings although variations and modifications may be effected without departing from the spirit and scope of the novel concepts of the disclosure.

DESCRIPTION OF THE PREFERRED EMBODIMENTS

While the principals of the present invention find a particular utility in a dust collecting apparatus, it will be understood that the filter assembly securing arrangement of the present invention may be utilized in other combinations. By way of exemplary disclosure of the best mode of practicing the invention, and by way of enabling one of ordinary skill in the art to practice my invention, the preferred embodiment is shown in FIGS. 1-6. Two alternative means of practicing my invention are described in FIGS. 7-9.

Figure 1:
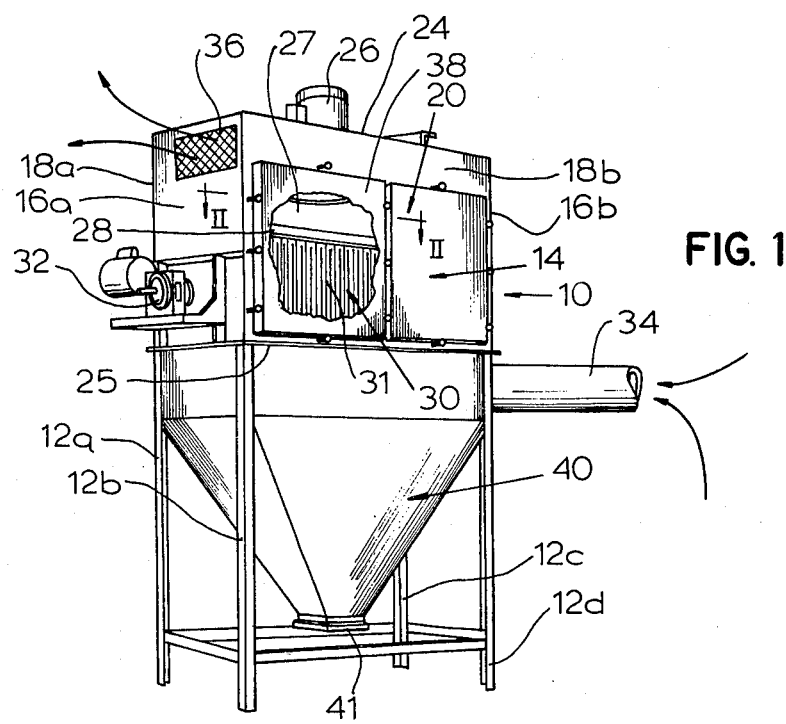
FIG. 1 is a perspective view of a dust collector unit having a quick release filter support system constructed in accordance with the principles of the present invention.

In FIG. 1 the reference numeral 10 indicates generally a dust collecting apparatus containing a filter suspension mounting of this invention. The apparatus 10 contains an upper generally rectangular casing 20 supported on legs 12a, 12b, 12c and 12d. The casing has longitudinal walls 18a, 18b and side wall 16a, 16b affixed to these legs. A top wall 24 closes the top of the casing 20 to form a hollow chamber 14 which is divided into a lower compartment or chamber 25 through which unfiltered air enters and a smaller upper chamber or compartment 27 receiving the filtered air.

A blower mechanism 26 is mounted to the top wall 24 of the dust collecting apparatus 10. Inserted into the hollow chamber 14 is a filter bag frame assembly 28 supporting a one piece fabric filter cloth bag 30 folded so as to form a series of essentially parallel U-shaped folds 31 which are stitched along their sides to define pockets therein. A vibrating mechanism 32 is attached to the side wall 16a of the dust collecting vessel 10. An air intake conduit 34 extends outwardly from the lower chamber 25 below said fabric filter cloth bag 30. A filter air exhaust conduit 36 is located above said filter fabric cloth bag 30 on the side wall 16a of the upper chamber 27. A door means 38 is provided for on the longitudinal wall 18b of the dust collecting vessel to facilitate insertion and removal for the fabric filter cloth assembly 28. A collecting hopper 40 with a door closure 41 is continuous with and positioned below the rectangular casing 20 at the bottom.

The blower mechanism 26 pulls air from the chamber 14 creating an air stream through the intake conduit 34 and into the lower chamber 25. The air then passes through the U-shaped folds of the fabric filter cloth 30 and up to 99.9% of the contaminants in the air are collected on the outer surfaces of the folds. The filtered air is then exhausted to the atmosphere through the conduit 36.

When the dust collecting apparatus is not operating, the vibrating mechanism 32 attached to the side wall 16a of the dust collecting vessel 10 may be employed to shake the U-shaped folds of the filter fabric cloth bag 30 which has the effect of removing accumulated dust and foreign particles from the surface area of the filter fabric cloth 30 and depositing these particles in the collecting hopper 40 positioned below the rectangular enclosure 20 where it may be removed through the door closure 41.

Figure 2:
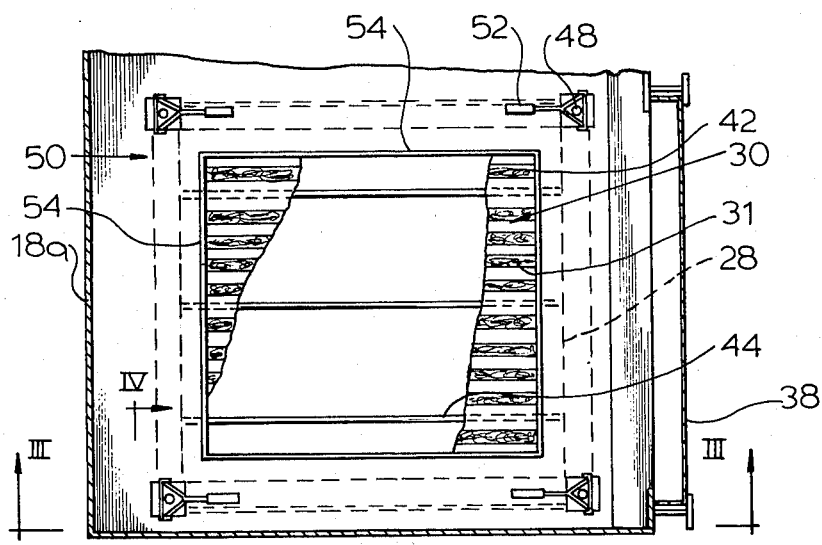
FIG. 2 is an enlarged, fragmentary longitudinal sectional view taken generally along the line II—II of FIG. 1.

As best seen in FIG. 2, the fabric filter cloth bag 30 is shown to be a series of essentially U-shaped parallel folds 31 containing a porous spacer material 42 such as fiberglass mesh or the like. Bar supports 44 are attached to said filter bag frame assembly 28 to provide additional support for said filter bag folds 31. Toggle clamps 48 are mounted on each of the four corners of an internal bulkhead structure 50 affixed to the rectangular casing 20 of the dust collecting vessel 10, said bulkhead structure 50 defining and separating the lower chamber 25 from the upper chamber 27 as shown in FIG. 1. As illustrated in FIG. 2, the toggle clamps 48 have actuation handles 52 shown in the down or release position. A structural support flange 54 which forms the upwardly directed portion of the internal bulkhead structure 50 is provided for in order to add strength to support the filter bag frame assembly 28.

Figure 3:
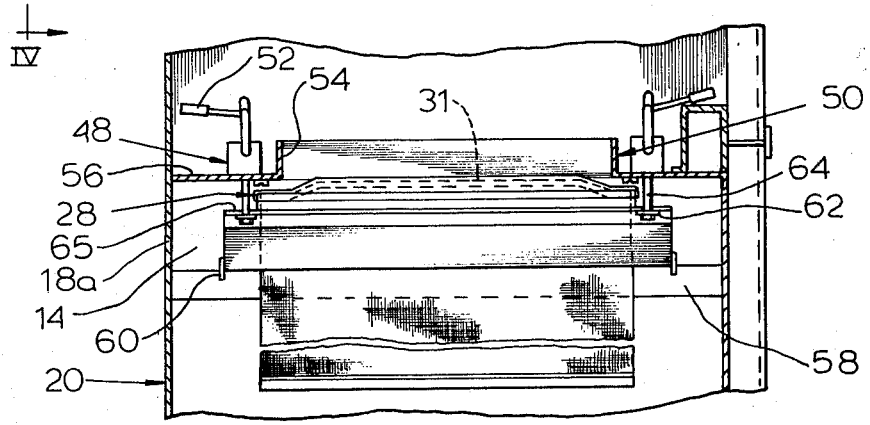
FIG. 3 is vertical sectional view taken generally along the line III—III of FIG. 2.

FIG. 3 illustrates the filter bag frame assembly 28 as it is assembled within the lower chamber 25 of the rectangular enclosure 20. A mounting plate 56, forming the horizontal portion of the internal bulkhead structure 50 as seen from a cross sectional perspective, is joined to the longitudinal wall 18a to provide a mounting platform for the toggle clamp 48. A support flange 54 is joined to the mounting plate 56 at essentially 90° defining an opening within said bulkhead 50 and providing additional structural integrity. The bag housing assembly 28 is inserted into the rectangular casing 20, supported and moved along rail means 58 into position below said flanged opening. Said bag frame assembly 28 is then moved into optimal placement using guide tabs 60 in order that said bag frame assembly 28 will be positioned when moved along said rails 58 and raised to form an air tight seal with the internal bulkhead structure 50. When properly positioned, the filter bag frame assembly 28 is elevated using a lifting means 62 attached to the end of a plunger 64 which together form the lower portion of the toggle clamp assembly 48. Said lifting means 62 is positioned under an outwardly extending angle iron 65 forming part of the bag frame assembly 28. The handle 52 of the toggle clamp 48 is moved in a semi-circular motion until the lifting means 62 of the toggle clamp 48 elevates the outwardly extending angle iron 65 of the bag frame assembly 28 so that the filter bag frame assembly 28 forms an air tight seal with the internal support structure 50 on four sides thereof.

Figure 4:
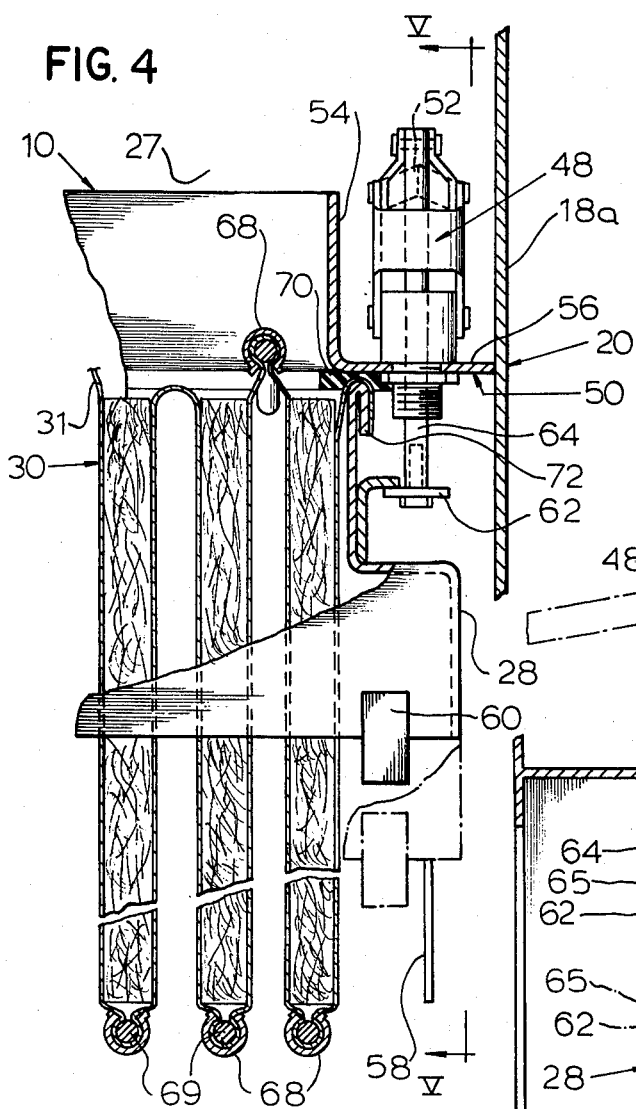
FIG. 4 is an enlarged fragmentary sectional view taken generally along the line IV—IV of FIG. 2.

FIG. 4 shows an enlarged sectional view of a partial segment of the bag frame assembly 28 in the operative or sealed position with the internal bulkhead structure 50. The filter bag 30 is shown as a series of U-shaped parallel folds 31 whose lower ends are pinched together by means of clips 68 and held in an essentially verticle position by means of weighted rods 69. Said clips 68 are placed on the upper ends of said U-shaped folds 31 only intermittently so as to provide some assistance in maintaining the position of the filter cloth 30, thus enabling the passage of filtered air through said U-shaped folds 31.

The lifting means 62 of the toggle clamp 48 elevates the outwardly extending angle iron 65 of the bag frame assembly 28 compressing cloth 30 between a hook shaped flange 72, located at the upper end of said filter cloth bag frame assembly 28, and the internal bulkhead structure 50 affixed to the rectangular casing 20 of the dust collecting vessel 10 forming an air tight seal. A gasket means 70 may be joined to the underside of the mounting flange 56 by means of adhesive. The toggle clamps 48 lift the filter bag frame assembly 28 so that the cloth 30 laying on the hook shaped flange 72 is drawn into immediate contact with said gasket 70, thus forming an air tight compressive seal.

Figure 5:
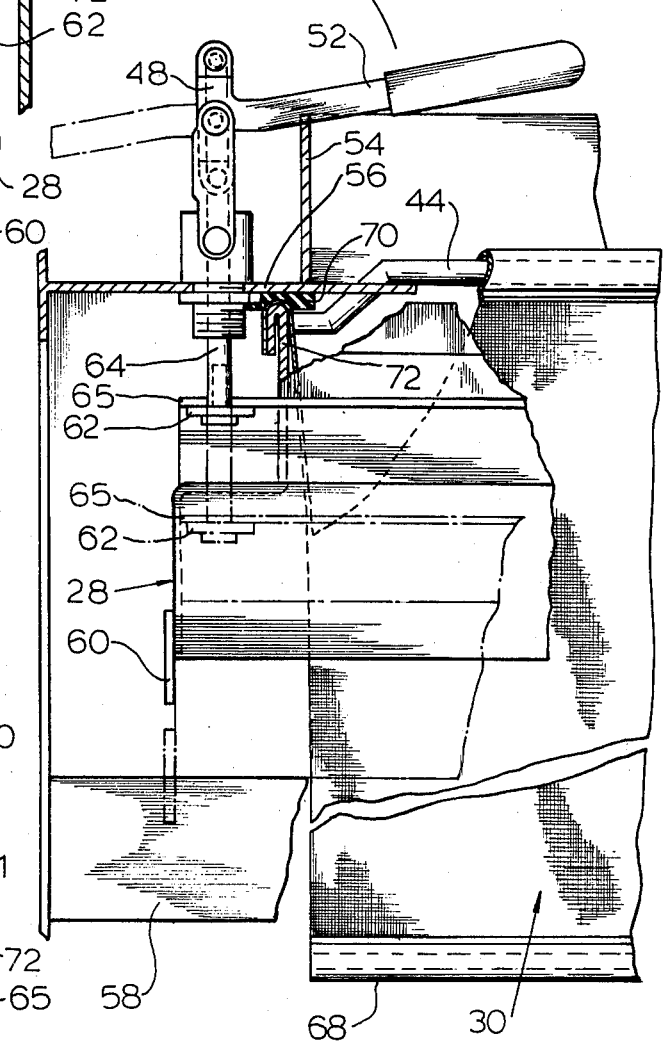
FIG. 5 is an fragmentary sectional view taken generally along the line V—V of FIG. 4.

FIG. 5 illustrates the filter bag frame assembly 28 forming an air tight seal with the gasket means 70 affixed to the underside of the internal bulkhead structure 50. As indicated by the arrow, when the plunger 64 is lowered by moving the handle 52 of the toggle clamp 48 approximately 180° in the direction of the arrow, the lifting means 62 lowers the angle iron 65, which in turn lowers the entire filter bag frame assembly 28 onto said rails 58, enabling a user to remove and replace said bag frame assembly 28 in a brief and efficient manner.

Figure 6:
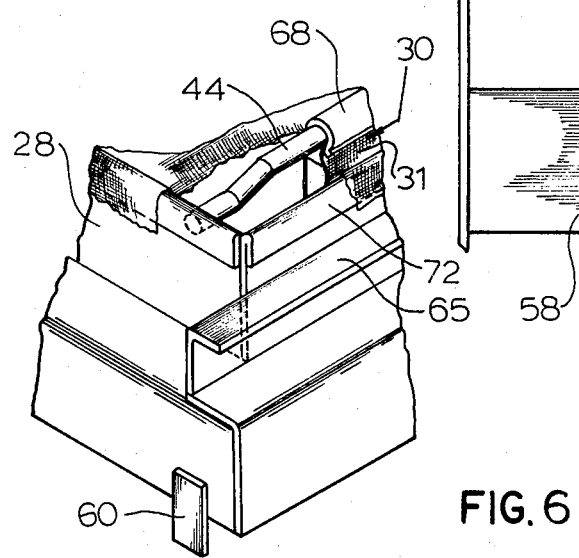
FIG. 6 is a fragmentary perspective view of the filter cloth support frame.

FIG. 6 is a enlarged view of the filter bag frame assembly 28 as seen from the perspective of a single corner. The support bar 44 exits from the clip means 68 attached to the top of the U-shaped fold 31 of the fabric filter bag 30 and is affixed to the hook shaped flange 72 formed at the top of the filter bag frame assembly 28. The angle iron 65 is affixed to said bag frame assembly 28.

Figure 7:
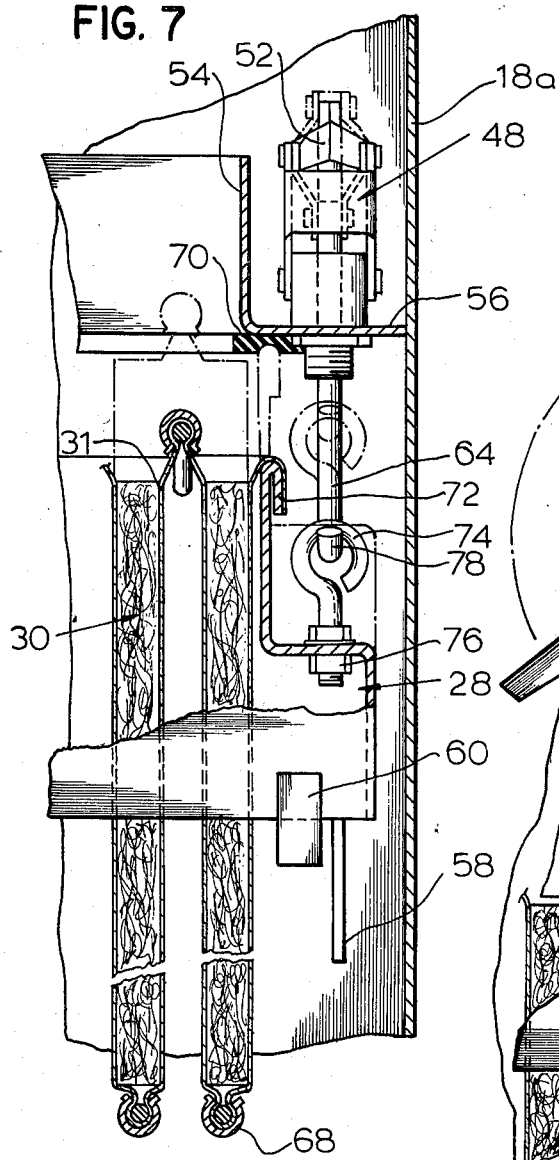
FIG. 7 is a sectional view similar to FIG. 4 showing an alternative form of the invention.

FIG. 7 illustrates an alternative means for creating the sealing effect necessary to perform the dust filtering process. An eye-bolt 74 is vertically secured to the filter bag frame assembly 28 by some fastening means, such as a hex nut 76. The plunger 64 of the toggle clamp 48 ends in a hook-like formation 78 which interconnects with said eye-bolt 74. When the handle 52 of the toggle clamp 48 is moved in a semicircular direction, the hook-like formation 78 engages and lifts said eye-bolt 74 which in turn raises the entire bag frame assembly 28 to form an air tight compressive seal with the gasket means 70 secured to the underside of the mounting flange 56.

Figure 8:
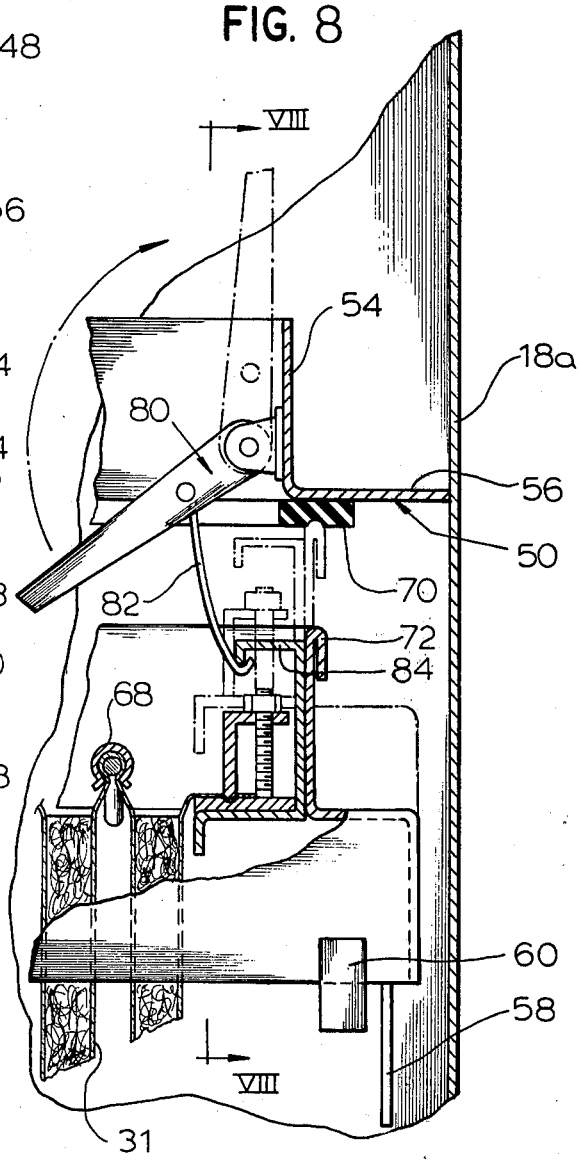
FIG. 8 is a sectional view similar to FIG. 5 and showing still another embodiment of the invention.
Figure 9:
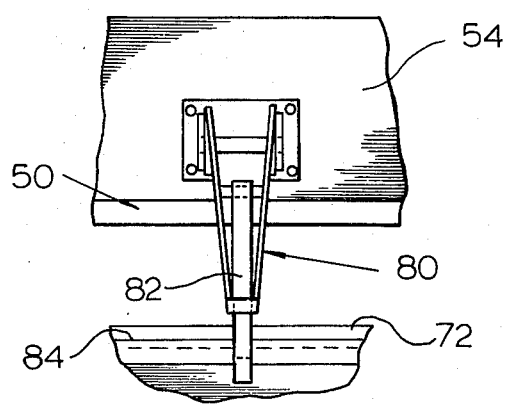
FIG. 9 is a sectional view at a reduced scale, taken generally along the line VIII—VIII of FIG. 8.

FIGS. 8 and 9 illustrate an additional means for performing the sealing function. A locking lever 80 is mounted to the support flange 54 of the internal bulkhead structure 50. A hook arm 82 is pivotably mounted to said locking lever 80. As indicated by the arrow in FIG. 8, when the locking lever 80 is moved toward the verticle position, the hook arm 82, which is positioned under the frame lug 84, lifts said frame lug 84 which in turn raises the filter bag frame assembly 28 to compressive engagement with gasket 70 to form an air tight seal with the mounting flange 56. A gasket means 70 is affixed to the underside of said mounting flange 56 to assist in forming an air tight seal. FIG. 9 illustrates the locking lever 80 as it is affixed to the support flange 54 of the L-shaped internal flange structure 50.

I claim as my invention:

1. A bag filter apparatus which comprises a casing, an open center bulkhead having top and bottom faces and dividing the casing into upper and lower compartments, a bag filter unit having a peripheral frame suspending filter bags, quick release clamping means mounted on said bulkhead having activating means positioned above said top face of said bulkhead and clamping said frame to said bottom face of said bulkhead, a dust collecting hopper communicating with said lower compartment, an exhaust blower communicating with said upper compartment, an air outlet communicating with said upper compartment, an air inlet communicating with said lower compartment, said blower pulling an air stream through the bag filters from said lower to said upper compartments and exhausting filtered air from said upper compartment of said casing through said air outlet to the surrounding atmosphere and a door positioned and arranged on said casing to provide access to said bulkhead for insertion and removal of said bag filter unit.

2. The bag filter apparatus of claim 1 in which the filter cloth bags are comprised of one continuous piece of cloth formed into a series of spaced U-shaped folds providing said bags and containing porous filler material in each of said bags holding the folds in spaced relation.

3. The bag filter apparatus of claim 1 in which the open center of said bulkhead is defined by a flange structure.

4. The bag filter aparatus of claim 1 in which said casing is generally rectangular in shape.

5. The bag filter apparatus of claim 1 in which an angle iron surrounds said peripheral frame and is engaged by said clamping means.

6. The bag filter apparatus of claim 1 in which said filter bags are formed from a cloth folded into a series of spaced U-shaped generally parallel folds.

7. The apparatus of claim 6 in which weighted rods affixed to the lower portions of said folds maintain the folds in essentially vertical orientation.

8. The bag filter apparatus of claim 1 wherein door closure means are provided at the lower end of said collecting hopper.

9. The bag filter apparatus of claim 1 wherein a vibration means is mounted in said casing to assist in the removal of dust and contaminants from the surfaces of said filter bags.

10. The bag filter apparatus of claim 1 in which eye bolts are mounted on said peripheral frame.

11. The bag filter apparatus of claim 10 wherein said quick release clamping means are lever activated hook means mounted on said bulkhead interconnecting with and elevating said eye bolts.

12. The bag filter apparatus of claim 1 wherein the clamping means have locking levers pivoted on the bulkhead and hook arm extension are pivoted on said levers to interconnect with and elevate said peripheral frame to form a sealing arrangement with said bulkhead.

13. The bag filter apparatus of claim 1 wherein gasket means are affixed to the underside of said bulkhead to be engaged by said peripheral frame.

14. The bag filter apparatus of claim 1 wherein said quick release clamping means are toggle clamps.

15. The apparatus of claim 14 wherein said toggle clamps are mounted to said bulkhead.

16. The apparatus of claim 14 wherein said toggle clamps have plungers releasably secured to said peripheral frame of said bag filter unit.

17. The apparatus of claim 16 wherein lifting means are mounted on said plungers of each of said clamps.

18. Dust collecting apparatus which comprises a casing, a peripheral bulkhead in said casing, a bag filter tray assembly suspended from said bulkhead dividing the casing into upper and lower compartments, an air inlet communicating with said lower compartment, an air outlet positioned in said upper compartment, a filter cloth suspended from said tray, clamps having actuating means positioned above said bulkhead so as to releasably secure the tray to the bulkhead in sealed relation therewith whereby the filter tray and cloth separate the casing into said upper and lower compartments and means for exhausting air through the casing to filter solids from the air on the surfaces of the filter cloth and a door positioned and arranged on said casing to provide access to said bulkhead for insertion and removal of said bag filter tray assembly.

19. A dust collecting apparatus which comprises a casing having a converging dust collecting hopper bottom, a peripheral bulkhead separating the casing into upper and lower compartments, said bulkhead having top and bottom faces, an air inlet means in communication with said lower compartment, an air outlet means in communication with said upper compartment, a filter unit having a peripheral frame around the top thereof fitting the bottom face of said bulkhead, a door on said casing positioned and arranged to provide access to said bulkhead for insertion and removal of said filter unit, said filter unit comprising a filter cloth spanning said frame and looped into spaced parallel filter bags suspended from the frame, clamp members suspended from said bulkhead releasably engaged with said peripheral frame, and levers mounted on said clamp members and positioned above said top face of said bulkhead so as to actuate said clamp members for drawing the peripheral frame against the bottom face of the bulkhead into sealed engagement therewith to suspend the filter unit from the bulkhead.

20. A bag filter apparatus which comprises a casing, an open center bulkhead having top and bottom faces and dividing the casing into upper and lower compartments, a bag filter unit having a peripheral frame suspending filter bags, quick release clamping means mounted on said bulkhead having activating means positioned above said top face of said bulkhead and clamping said frame to said bottom face of said bulkhead, a dust collecting hopper communicating with said lower compartment, an exhaust blower communicating with said upper compartment, an air outlet communication with said upper compartment, an air inlet communicating with said lower compartment, said blower pulling an air stream through the bag filters from said lower to said upper compartment and exhausting filtered air from said upper compartment of said casing through said air outlet to the surrounding atmosphere, a first door on said casing positioned and arranged to provide access to said bulkhead for insertion and removal of said bag filter unit, and a second door on said casing positioned and arranged to provide access to said bulkhead for activating said quick release clamping means.

* * * * *